Aug. 15, 1944.　　J. F. KOSKY ET AL　　2,355,980
SPARE WHEEL CARRIER
Filed July 3, 1942
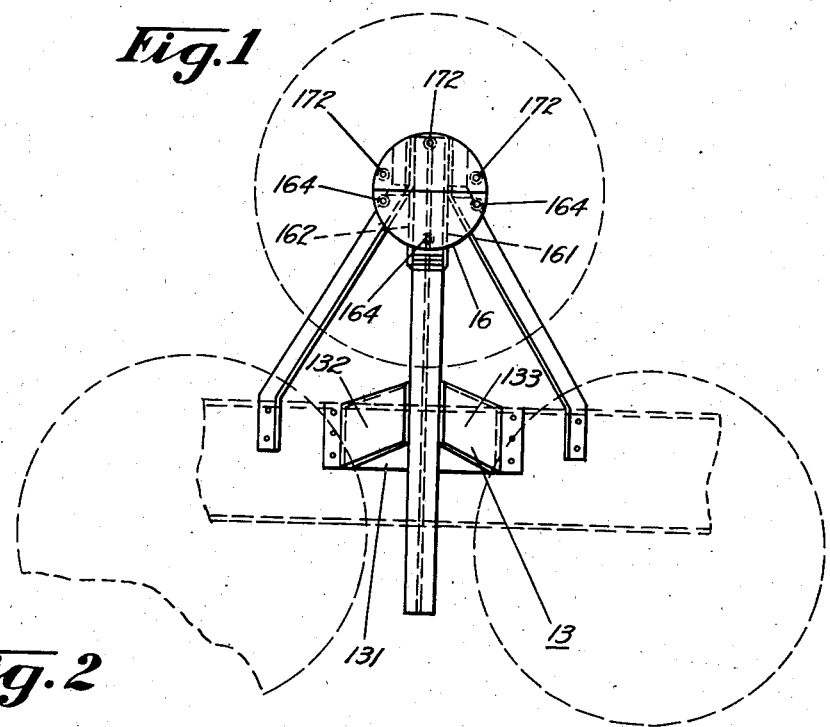
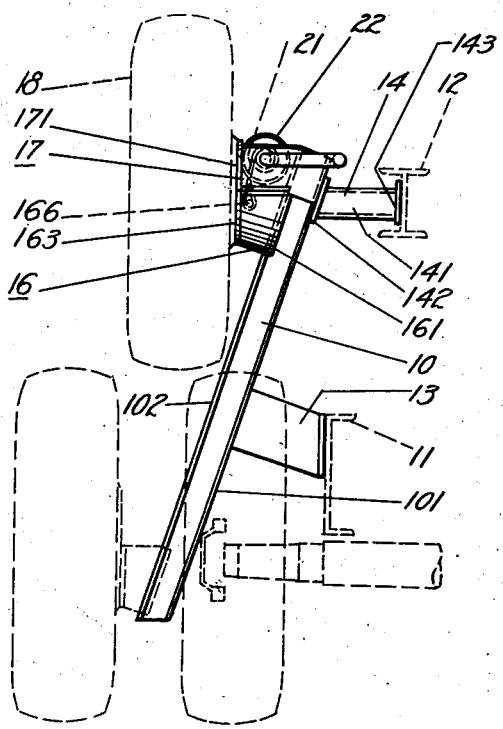
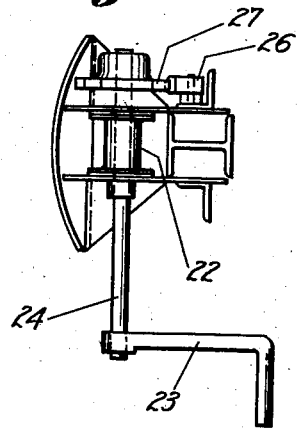
INVENTOR.
JAMES F. KOSKY
ROBERT F. PLUMB
BY
Flournoy Corey
ATTORNEY.

Patented Aug. 15, 1944

2,355,980

UNITED STATES PATENT OFFICE 2,355,980

SPARE WHEEL CARRIER

James F. Kosky and Robert F. Plumb, Cedar Rapids, Iowa, assignors to Iowa Manufacturing Company, Cedar Rapids, Iowa, a corporation of Iowa Application July 3, 1942, Serial No. 449,654

4 Claims. (Cl. 224—29)

This invention relates to vehicles and has particular relation to means for raising, lowering and carrying spare wheels and tires for such vehicles.

The wheels and tires for vehicles such as trucks, trailers, mobile crusher plants and the like are so heavily loaded that these members themselves must be quite heavy and cumbersome to carry the load imposed upon them. It is the usual practice, in vehicles of this character, to carry one or more spare wheels and tires so that a damaged wheel or tire may be replaced. Frequently the vehicle is moved about or driven or towed by only one or two men. The spare wheels and tires are preferably elevated when carried on the vehicle and thus the changing of wheels and tires constitutes a considerable problem by reason of the weight and bulk of the wheels and tires employed on the vehicle.

The placing or mounting location of the spare wheel and tire on the vehicle constitutes still another problem. Frequently it is very desirable that the spare wheel be considerably elevated above the road-way where it is out of the way, and it is also desirable that the spare wheel, when being carried, be located for the most part within the confines of the vehicle to avoid having projecting portions. On the other hand, it is desirable that the wheel being loaded on the vehicle be raised from a point outside of the perimeter of the vehicle.

It is accordingly among the objects of our invention to provide means for raising and lowering the heavy wheels and tires of a vehicle, and for carrying such wheels and tires on the vehicle.

It is another object of our invention, in providing means for raising and lower wheels, to provide means for carrying the wheels upwardly from a point outside of the perimeter of the vehicle to a carrying position for the most part within the confines of the vehicle.

Still another object of our invention is to provide means for firmly locking the wheel onto a portion of the spare wheel carrier while the wheel is still positioned on the ground, and other means on the carrier so that the wheel may be raised and locked in its raised or carrying position.

Other and further features and objects of the invention will be more apparent to those skilled in the art upon a consideration of the accompanying drawing and following specifications, wherein is disclosed a single exemplary embodiment of the invention, with the understanding, however, that such changes may be made therein as fall within the scope of the appended claims, without departing from the spirit of the invention.

In said drawing:

Figure 1 is a view in side elevation of a carrier constructed according to one embodiment of our invention.

Figure 2 is a view in rear elevation of the carrier shown in Figure 1, and

Figure 3 is a plan view, partly in plan and partly in section, of the carrier shown in Figures 1 and 2.

Referring now to the drawing:

A carrier constructed according to one embodiment of our invention includes the beam indicated at 10. This beam preferably is of H-shape in cross section. The beam is supported from main members of the vehicle, indicated in dotted lines at 11 and 12, by means of suitable flanged bases indicated at 13 and 14. The member 13 includes a plate 131 secured to the frame member 11 of the vehicle and having outwardly converging plate members 132 and 133 welded or otherwise secured to the ends of the plate 131 and to the inner flange 101 of the beam 10.

The upper member 14 may be made of a suitable fabricated member such as a short beam of box section, indicated at 141, and having welded, flanged ends 142 and 143.

The beam 10 is preferably located and positioned on the vehicle in such a manner that it inclines inwardly from bottom to top in such a manner that the lower end of the beam 10 is outside of the periphery of the vehicle. The upper end is preferably so located that at least the carrier is within the periphery of the vehicle although the wheel and tire may project outside if desired, all depending on the space limitations.

The spare wheel carrier is constructed of two approximately semi-cylindrical members indicated at 16 and 17. The lower member 16 is provided with suitable flanges at 161 and 162 for slidingly engaging the outer flange 102 of the H-shaped beam 10. The movable portion of the carrier or slide, as we may term it, may thus move up and down on the beam 10. This slide is provided with the flanged portion 163 at its outer base which is adapted to receive the hub-portion of the spare wheel indicated generally by the dotted lines 18. Flange 163 is provided with threaded openings 164 for receiving the bolts that pass through the center of the wheel so that the hub of the wheel may be locked or bolted to this sliding portion of the carrier.

The upper member 17 is stationary and secured to the upper end of the beam 10. It is also provided with a flange 171 of semi-circular form having threaded openings 172 therein for receiving other bolts which pass through the hub of the spare wheel 18.

A pin 166 passes transversely through the slide member 16 to afford a purchase for a lifting cable 21. The drum 22 of the hoist member is positioned for rotation within the carrier or support 17 and the cable 21 may be wound upon this drum 22 by rotation of the crank 23 and shaft 24. A latch mechanism of usual construction is provided at 26 and this engages suitable ratchet teeth at 27 so that when the wheel has been raised to position, it may be held by the latch 26 until the wheel can be bolted to the upper member 17.

In use the upper bolts received in the openings 172 are removed whenever it is desirable to change a wheel. Tension is applied to the cable 21 by means of the crank 23, and the latch 26 is released. The cable 21 may be unwound to let the spare wheel and tire down to the ground. The spare wheel is then unbolted from the member 16 and applied to the axle. The damaged wheel or tire is then rolled to position with the hub against the member 16. The hub is bolted to the member 16 and the winch is used to raise the wheel to its upper or carrying position where it may be locked to the stationary position of the carrier by means of bolts through the openings 172.

It is to be noted that the lower end of the beam 10 is so disposed that the wheel being changed is located well outside of the perimeter of the vehicle, but that the upper end of the beam 10 is so located that the wheel may be positioned above the other wheels of the vehicle and either within the vehicle confines or partly outside, as desired.

Although we have described a specific embodiment of our invention, it is apparent that modifications thereof may be made by those skilled in the art. Such modifications may be made without departing from the spirit and scope of our invention as set forth in the appended claims.

We claim as our invention:

1. In a device of the character described, a divided hub engaging member comprising a lower slide to which the lower portion of a vehicle wheel hub may be bolted, an upper stationary member to which the upper portion of the wheel hub may be bolted for locking it into place, the members making use of the locking means ordinarily used for locking the wheel in place on the axles of the vehicle.

2. In a wheel lift, a substantially vertically disposed guide member, a substantially semi-cylindrical slide adapted to engage the guide member to move up and down thereon, the semi-cylindrical member being provided with means for receiving the lower cylindrical portion of the hub of a wheel, another semi-cylindrical member at the top of the guide adapted to abut against the first named semi-cylindrical member when the first member is in raised position and having means thereon for fastening the upper cylindrical portion of the wheel hub thereto to support the wheel in raised position, and means for raising and lowering the slide and the wheel.

3. A wheel carrier comprising a substantially vertically disposed guide member, a slide movable up and down on said guide member, said slide comprising a semi-cylindrical member to which the lower portion of the hub of a wheel may be bolted, and a stationary semi-cylindrical member near the top of the guide means to which the upper portion of the wheel hub may be bolted when the wheel is moved to its raised position.

4. A wheel carrier comprising in combination a divided cylindrical hub engaging member, a substantially vertically disposed guide member, a slide movable on the guide member and carrying with it the lower portion of the hub engaging member, the upper portion of the hub engaging member being mounted near the top of the guide means, the hub engaging members engaging respectively the upper and lower portions of the wheel hub.

ROBERT F. PLUMB.
JAMES F. KOSKY.